United States Patent
Ko

(10) Patent No.: US 9,013,627 B2
(45) Date of Patent: Apr. 21, 2015

(54) IMAGE CAPTURING DEVICE AND CAPTURING METHOD WITH LIGHT ASSISTANCE

(71) Applicant: Acer Incorporated, New Taipei (TW)

(72) Inventor: Chueh-Pin Ko, New Taipei (TW)

(73) Assignee: Acer Incorporated, New Taipei (TW)

(*) Notice: Subject to any disclaimer, the term of this patent is extended or adjusted under 35 U.S.C. 154(b) by 0 days.

(21) Appl. No.: 13/913,530

(22) Filed: Jun. 10, 2013

(65) Prior Publication Data

US 2014/0002687 A1   Jan. 2, 2014

(30) Foreign Application Priority Data

Jun. 27, 2012 (TW) .............................. 101123008 A

(51) Int. Cl.
  *H04N 5/222*   (2006.01)
  *H04N 5/225*   (2006.01)
  *H04N 5/235*   (2006.01)
  *H04N 5/232*   (2006.01)

(52) U.S. Cl.
  CPC .......... *H04N 5/2256* (2013.01); *H04N 5/23212* (2013.01); *H04N 5/23219* (2013.01); *H04N 5/2354* (2013.01)

(58) Field of Classification Search
  CPC .... H04N 5/2256; H04N 5/2354; H04N 5/225
  USPC ............ 348/370, 371, 222.1, 223.1; 396/182; 455/344
  See application file for complete search history.

(56) References Cited

U.S. PATENT DOCUMENTS

| | | | |
|---|---|---|---|
| 2002/0080999 A1 | 6/2002 | Bani-Hashemi et al. | |
| 2004/0212725 A1* | 10/2004 | Raskar | 348/370 |
| 2004/0242184 A1* | 12/2004 | Ito | 455/344 |
| 2006/0067668 A1* | 3/2006 | Kita | 396/182 |
| 2008/0193119 A1 | 8/2008 | Miyazaki | |
| 2009/0059058 A1 | 3/2009 | Okabe et al. | |
| 2009/0073275 A1* | 3/2009 | Awazu | 348/222.1 |
| 2010/0238342 A1 | 9/2010 | Ollila et al. | |
| 2013/0010155 A1* | 1/2013 | Hamada | 348/223.1 |

FOREIGN PATENT DOCUMENTS

| | | |
|---|---|---|
| CN | 101916030 A | 12/2010 |
| TW | 201101815 | 1/2011 |
| TW | M396982 | 1/2011 |
| WO | 2006129777 | 12/2006 |
| WO | 2008039462 | 4/2008 |

* cited by examiner

*Primary Examiner* — Sinh Tran
*Assistant Examiner* — Zhenzhen Wu
(74) *Attorney, Agent, or Firm* — Jianq Chyun IP Office

(57) ABSTRACT

An image capturing device and a capturing method with light assistance are provided, wherein the image capturing device has a multi-directional lighting unit. In the method, at least two areas are defined continuously according to information provided by the image capturing device after the image capturing device enters a capture mode. Before a capture result is obtained, the multi-directional lighting unit is dynamically controlled to project different light beams to at least two latest areas.

17 Claims, 4 Drawing Sheets

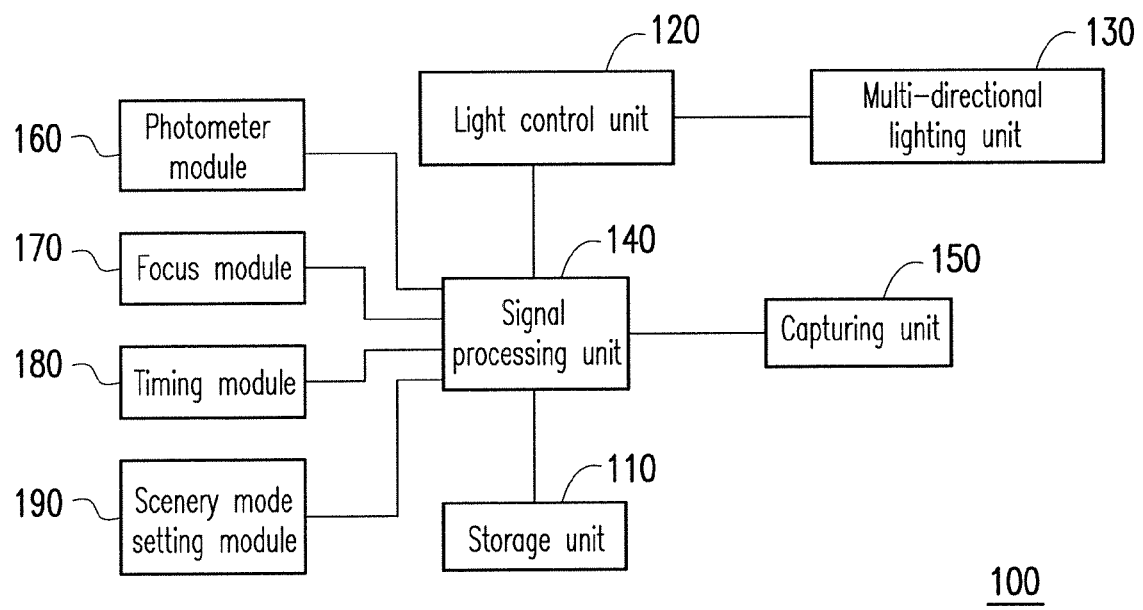
FIG. 1
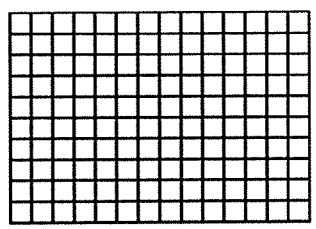 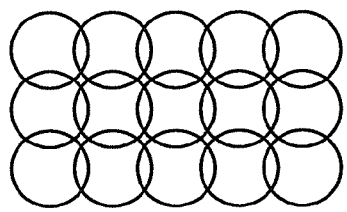
FIG. 2A  FIG. 2B

IMAGE CAPTURING DEVICE AND CAPTURING METHOD WITH LIGHT ASSISTANCE

CROSS-REFERENCE TO RELATED APPLICATION

This application claims the priority benefit of Taiwan application serial no. 101123008, filed on Jun. 27, 2012. The entirety of the above-mentioned patent application is hereby incorporated by reference herein and made a part of this specification.

BACKGROUND OF THE INVENTION

1. Field of the Invention

The invention relates to an image capturing device and more particularly relates to an image capturing device integrated with a multi-directional lighting unit and a capturing method with light assistance.

2. Description of Related Art

As the technology of semiconductors and DSP (digital signal process) advances, the development and application of computers are diversified, and digital cameras and digital video recorders become indispensable tools today. The photos or videos captured by digital cameras and digital video recorders can be directly stored in the form of digital files and can be displayed, read, edited, stored, or output by computers or other electronic devices, which is very convenient to the user in comparison with the traditional cameras and video recorders.

Today many digital cameras and digital video recorders available in the market are equipped with pico projectors therein for the user to output the captured photos or images directly. To such products, the pico projectors simply serve as devices for outputting images. In other words, there is no linkage between the pico projectors and the digital cameras or video recorders. So far no technology has been developed to integrate them.

SUMMARY OF THE INVENTION

The invention provides an image capturing device and a capturing method with light assistance, which provide light by analyzing the user's need to achieve a better capture result.

The invention provides a capturing method with light assistance, adapted for an image capturing device equipped with a multi-directional lighting unit. The capturing method includes continuously defining at least two areas according to information provided by the image capturing device after the image capturing device enters a capture mode, and dynamically controlling the multi-directional lighting unit to project different light beams to at least two latest-defined areas before a capture result is obtained.

In an embodiment of the invention, wherein the image capturing device continuously obtains a preview image after entering the capture mode, and the step of continuously defining the at least two areas according to the information provided by the image capturing device comprises: periodically performing an image processing on a latest preview image to obtain image feature information, analyzing the image feature information to obtain an image recognition result, and defining at least two areas according to the image recognition result.

In an embodiment of the invention, the capturing method further includes referring to a light property setting corresponding to the image feature information to determine the different light beams to be respectively projected to the at least two latest-defined areas.

In an embodiment of the invention, the image feature information includes face feature information, subject position information, and subject identification information.

In an embodiment of the invention, wherein the step of continuously defining the at least two areas according to the information provided by the image capturing device after the image capturing device enters the capture mode comprises: obtaining capture function information of the image capturing device, and defining the at least two areas according to the capture function information. The at least two areas are redefined according to the latest capture function information whenever the capture function information changes.

In an embodiment of the invention, the capturing method further includes referring to a light property setting corresponding to the capture function information to determine the different light beams to be respectively projected to the at least two latest-defined areas.

In an embodiment of the invention, the capture function information includes composition information, scenery mode setting information, countdown status information, flashlight information, focus status information, and exposure status information.

In an embodiment of the invention, wherein the step of dynamically controlling the multi-directional lighting unit to simultaneously project the different light beams to the at least two latest-defined areas comprises: generating an image signal according to the at least two latest-defined areas and a light property setting corresponding to the information, transmitting the image signal to the multi-directional lighting unit, and outputting the image signal by the multi-directional lighting unit to simultaneously project the different light beams to the at least two latest-defined areas.

In an embodiment of the invention, wherein the step of dynamically controlling the multi-directional lighting unit to simultaneously project the different light beams to the at least two latest-defined areas comprises: generating a control signal according to the at least two latest-defined areas and a light property setting corresponding to the info nation, and transmitting the control signal to the multi-directional lighting unit. The multi-directional lighting unit adjusts one of a color setting and a DMD (Digital Micro-mirror Device) status setting or a combination thereof according to the control signal to simultaneously project the different light beams to the at least two latest-defined areas.

In an embodiment of the invention, the different light beams respectively projected to the at least two latest-defined areas have different light colors and/or light intensities.

In an embodiment of the invention, the capturing method further includes determining whether the different light beams that are respectively projected to the at least two latest-defined areas are not projected to a specific target according to the capture result after obtaining the capture result. If the different light beams are not projected to the specific target, the multi-directional lighting unit is dynamically controlled to simultaneously project the different light beams to the at least two latest-defined areas according to a spatial difference between projection positions of the different light beams projected to the at least two latest-defined areas and the specific target before obtaining a next capture result.

In an embodiment of the invention, the capturing method further includes: if a position of the latest-defined areas changes before the capture result is obtained, the multi-directional lighting unit is controlled to continuously project the different light beams to the latest-defined areas according to the change of the position.

On the other hand, the invention provides an image capturing device that includes a multi-directional lighting unit, a capturing unit, and a light control unit. The multi-directional lighting unit is used for simultaneously projecting different light beams toward different directions. The light control unit is coupled to the multi-directional lighting unit and the capturing unit. The light control unit continuously defines at least two areas according to information provided by the image capturing device after the image capturing device enters a capture mode, and the light control unit dynamically controls the multi-directional lighting unit to simultaneously project the different light beams to at least two latest-defined areas before the capturing unit obtains a capture result.

In an embodiment of the invention, the image capturing device further includes a storage unit coupled to the light control unit for storing a light property setting respectively corresponding to the information.

In an embodiment of the invention, the image capturing device further includes a signal processing unit coupled between the capturing unit and the light control unit. The capturing unit constantly obtains a preview image after the image capturing device enters the capture mode, and the signal processing unit periodically perform is an image processing on the latest preview image to obtain image feature information, analyzes the image feature information to obtain an image recognition result, and transmits the image recognition result to the light control unit. The light control unit defines the at least two areas according to the image recognition result.

In an embodiment of the invention, the light control unit refers to the light property setting corresponding to the image feature information stored in the storage unit to determine the different light beams that are to be respectively projected to the at least two latest-defined areas.

In an embodiment of the invention, the image feature information includes face feature information, subject position information, and subject identification information.

In an embodiment of the invention, the light control unit obtains capture function information of the image capturing device and defines the at least two areas according to the capture function information after the image capturing device enters the capture mode. The light control unit redefines the at least two areas according the latest capture function information whenever the capture function information changes.

In an embodiment of the invention, the light control unit refers to the light property setting corresponding to the capture function information stored in the storage unit to determine the different light beams that are to be respectively projected to the at least two latest-defined areas.

In an embodiment of the invention, the capture function information includes composition information, scenery mode setting information, countdown status information, flashlight information, focus status information, and exposure status information.

In an embodiment of the invention, the light control unit generates an image signal according to the at least two latest-defined areas and the light property setting stored in the storage unit corresponding to the information and transmits the image signal to the multi-directional lighting unit. The multi-directional lighting unit outputs the image signal to simultaneously project the different light beams to the at least two latest-defined areas.

In an embodiment of the invention, the light control unit generates a control signal according to the at least two latest-defined areas and the light property setting corresponding to the information stored in the storage unit and transmits the control signal to the multi-directional lighting unit. The multi-directional lighting unit adjusts one of a color setting and a DMD status setting or a combination thereof according to the control signal to simultaneously project the different light beams to the at least two areas.

In an embodiment of the invention, the multi-directional lighting unit is a projector or a projecting device.

In an embodiment of the invention, the multi-directional lighting unit is formed of a plurality of light emitting diodes (LED) having a lens.

In an embodiment of the invention, the different light beams respectively projected to the at least two latest-defined areas have different light colors and/or light intensities.

In an embodiment of the invention, the light control unit determines whether the different light beams that are respectively projected to the at least two latest-defined areas are not projected to a specific target according to the capture result after obtaining the capture result. If the different light beams are not projected to the specific target, the light control unit dynamically controls the multi-directional lighting unit to simultaneously project the different light beams to the at least two latest-defined areas according to a spatial difference between projection positions of the different light beams projected to the at least two latest-defined areas and the specific target before obtaining a next capture result.

In an embodiment of the invention, if a position of the at least two latest-defined areas changes before the capture result is obtained, the light control unit controls the multi-directional lighting unit to continuously project the different light beams to the at least two latest-defined areas according to the change of the position.

Based on the above, the invention utilizes the characteristic of the multi-directional lighting unit, i.e. simultaneously projecting different types of light beams toward multiple directions, and projects different light beams to at least two areas according to image feature information of a preview image and/or capture function information of the image capturing device, thereby achieving a better capture result.

In order to make the aforementioned features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate embodiments and, together with the description, serve to explain the principles of the invention.

FIG. 1 is a block diagram illustrating an image capturing device according to an embodiment of the invention.

FIGS. 2A and 2B are schematic diagrams illustrating shapes of areas according to an embodiment of the invention.

DESCRIPTION OF EMBODIMENTS

Figure 3:
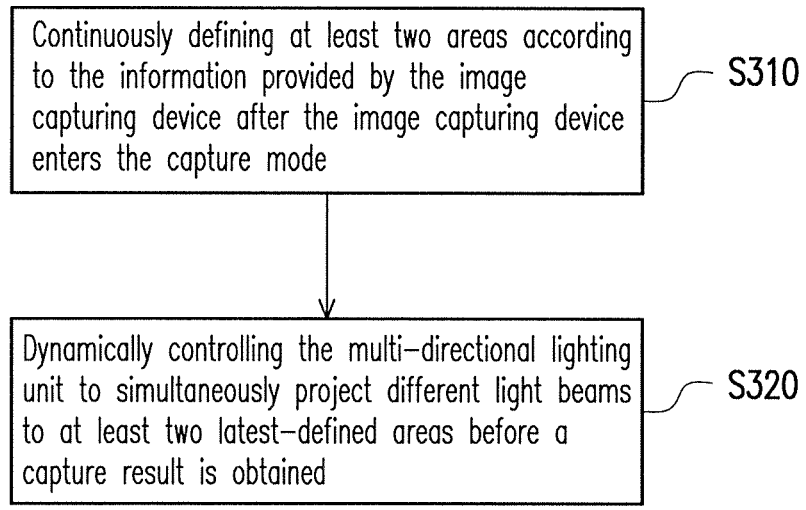
FIG. 3 is a flowchart showing a light-assistance capturing method according to an embodiment of the invention.

A projector itself has the functions of emitting light and projecting different light beams respectively to different areas. For an image capturing device equipped with such a multi-directional lighting projector, if the projector can be controlled according to the information obtained by the image capturing device to continuously project light beams of different colors, brightness, or types to different spatial areas for capturing images, the image capturing device can produce a capture result that better satisfies the user. Considering the above, the invention provides an image capturing device and a capturing method with light assistance. In order to make the invention more comprehensible, embodiments are described below as examples to show that the invention can actually be realized.

FIG. 1 is a block diagram illustrating an image capturing device according to an embodiment of the invention. Referring to FIG. 1, an image capturing device 100 includes a capturing unit 110, a light control unit 120, a multi-directional lighting unit 130, a signal processing unit 140, a storage unit 150, a photometer module 160, a focus module 170, a timing module 180, and a scenery mode setting module 190. In this embodiment, the image capturing device 100 is a digital camera or a digital video recorder, but the invention is not limited thereto.

The capturing unit 110 is for example an optical sensor, such as a charged couple device (CCD) or complementary metal-oxide-semiconductor (CMOS), for sensing light to form an image.

The light control unit 120 is coupled to the multi-directional lighting unit 130 for controlling the multi-directional lighting unit 130 to project a specific type of light to a desired area. How the light control unit 120 controls the multi-directional lighting unit 130 will be explained in detail below with reference to the drawings.

The multi-directional lighting unit 130 is capable of emitting different light beams simultaneously toward different directions. That is to say, the multi-directional lighting unit 130 is capable of projecting different types of light beams respectively to at least two areas at the same time. The shapes of the areas are relevant to a type of the multi-directional lighting unit 130. For example, given the multi-directional lighting unit 130 is a pico projector, the shapes of the areas that correspond thereto are each rectangular, as shown in FIG. 2A. In another embodiment of the invention, given the multi-directional lighting unit 130 is formed by a plurality of LEDs (light emitting diodes) light each with lenses, the shapes of the areas that correspond thereto are each circular, as shown in FIG. 2B. In addition, the multi-directional lighting unit 130 can be any type of projecting device or projector.

The signal processing unit 140 is coupled between the capturing unit 110 and the light control unit 120. Moreover, the signal processing unit 140 is also coupled to the storage unit 150, the photometer module 160, the focus module 170, the timing module 180, and the scenery mode setting module 190. The signal processing unit 140 is mainly used for converting an analog image signal captured by the capturing unit 110 into a digital signal and performing various processes on the digital signal. In this embodiment, the signal processing unit 140 is a DSP unit (digital signal processing unit) for example.

The storage unit 150 is a memory embedded in the image capturing device 100 or a detachable memory card. Specifically, the types of memory cards include SM card (smart media card), SD card (secure digital card), MMC card (multi media card), CF card (compact flash card), memory stick, and etc. The storage unit 150 is used for storing light property settings that respectively correspond to different information provided by the image capturing device 100. Specifically, the light property settings include one of color, intensity, duration, and pattern of the light, or a combination of the above. The light property settings are set by the user or adjusted by a system according to the current state of use.

The photometer module 160 is used for measuring a light beam that has passed through a lens (not shown) to determine the aperture or shutter speed and ISO, thereby reflecting the luminosity required and controlling ON/OFF of a flashlight (not shown) and time of flash.

The focus module 170 provides a manual focus or auto focus function and is used for detecting the contrast of a captured subject at a focus center to determine if the image is in focus and clear.

The timing module 180 is used for automatically initiating a countdown in a self-timer mode and allowing the capturing unit 110 to automatically obtain a capture result when the countdown is over.

The scenery mode setting module 190 allows the user to set a scenery mode, such as portrait, night, night portrait, backlight portrait, scenery, indoor, etc. and provides settings of exposure compensation, white balance mode, ISO, etc.

In order to further describe the operation of the image capturing device 100, another embodiment is illustrated as follows to explain the invention. FIG. 3 is a flowchart showing a light-assistance capturing method according to an embodiment of the invention. Please refer to FIG. 1 and FIG. 3 at the same time.

First, as shown in Step S310, after the image capturing device 100 enters a capture mode, the light control unit 120 continuously defines at least two areas according to the information provided by the image capturing device 100. Herein, the image capturing device 100 enters the capture mode after the power is turned on or after the lens is opened, or whenever the user performs a specific operation (such as pressing a specific button). The information provided by the image capturing device 100 includes the image feature information obtained from the signal processing unit 140 performing image processing on a preview image captured by the capturing unit 110 and various capture function information related to the capture functions of the image capturing device 100. The light control unit 120 defines at least two areas according to one of the image feature information and the capture function information, or a combination of the above.

Next, as shown in Step S320, the light control unit 120 dynamically controls the multi-directional lighting unit 130 to simultaneously project different light beams to at least two latest-defined areas before the capturing unit 110 actually obtains a capture result (for example, before the shutter button is pressed). For example, the light control unit 120 controls the directions in which the multi-directional lighting unit 130 projects light beams according to positions of the areas and refers to the light property settings stored in the storage unit 150 corresponding to the image feature information and/or capture function information to determine what types of light beams are projected to the latest-defined areas.

The following embodiments explain how the light control unit 120 defines at least two areas according to the different information provided by the image capturing device 100.

Figure 4:
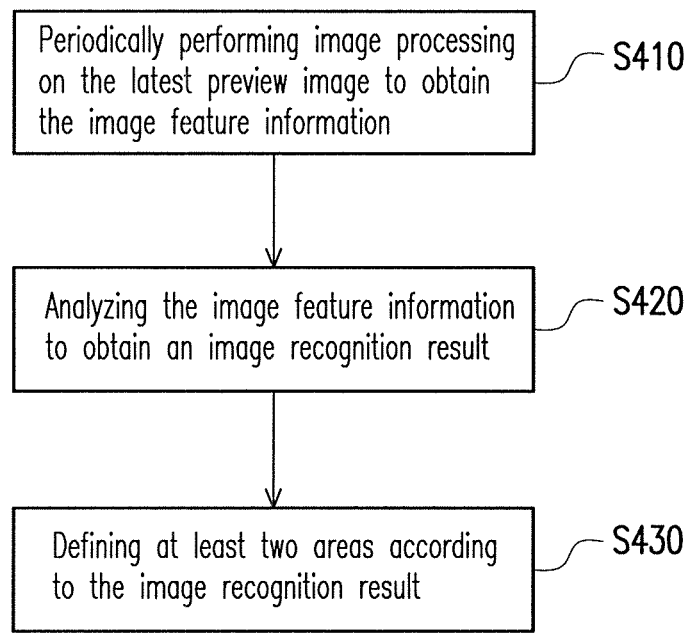
FIG. 4 is a flowchart showing a process of defining areas based on image feature information according to an embodiment of the invention.

FIG. 4 is a flowchart showing a process of defining areas based on image feature information according to an embodiment of the invention. In this embodiment, the capturing unit 110 constantly obtains the preview image after the image capturing device 100 enters the capture mode, and as shown in Step S410, the signal processing unit 140 periodically performs image processing on the latest preview image to obtain the image feature information. More specifically, the image feature information includes face feature information, subject position information, subject identification information, etc. The invention does not limit an algorithm for the image processing.

Then, in Step S420, the signal processing unit 140 analyzes the image feature information to obtain an image recognition result and transmits the image recognition result to the light control unit 120. For example, the signal processing unit 140 analyzes the face feature information to obtain positions of the face, eyes, and mouth. The signal processing unit 140 also analyzes the subject position information to distinguish a foreground and a background of the image. The signal processing unit 140 also analyzes the subject identification information to obtain the position of a holder (or other specific persons) of the image capturing device 100 in the preview image.

Finally, as shown in Step S430, the light control unit 120 defines at least two areas according to the image recognition result. For example, the foreground of the image is defined as one area and the background is defined as another area. Otherwise, the position of the face or the eyes is defined as one area and the rest is defined as another area. It should be noted that the above is merely an example of the invention, and the invention does not limit the way the light control unit 120 defines areas based on various image recognition results.

The following paragraphs provide an example with reference to FIGS. 5-9, which are schematic diagrams illustrating that the multi-directional lighting unit 130 is controlled by the light control unit 120 to project different light beams to at least two latest-defined areas after they are defined by the process of FIG. 4.

Figure 5:
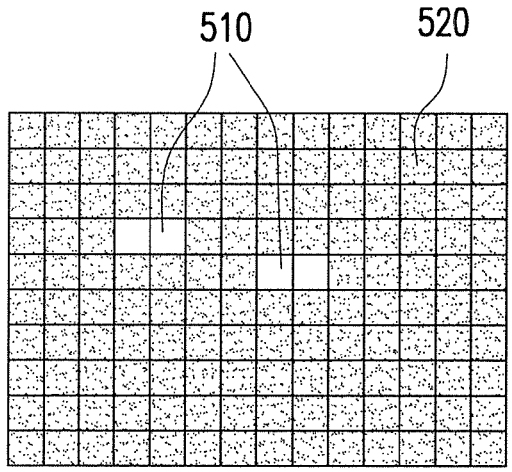
FIGS. 5, 6, 7, 8, 9, and 11 are schematic diagrams illustrating the at least two areas to which the multi-directional lighting unit projects different light beams according to several embodiments of the invention.

Referring to FIG. 5, in this embodiment, given the image feature information that the signal processing unit 140 obtains through image processing on the preview image is the face feature information, the light control unit 120 defines the positions of the eyes as a first type area 510 (blank area in FIG. 5) and defines the rest of the capture range as a second type area 520 (scrambled dotted area in FIG. 5) after receiving the image recognition result of the positions of the eyes. The light control unit 120 controls the multi-directional lighting unit 130 to project a predetermined light beam corresponding to a current flashlight setting to the second type area 520 but project a weaker light beam (or project no light beam) to the first type area 510 where the eyes are located. Such a projection method prevents a red-eye effect.

Figure 6:
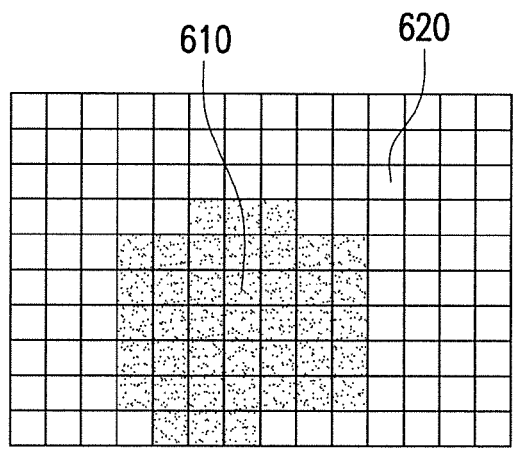

Referring to FIG. 6, in this embodiment, given the image feature information that the signal processing unit 140 obtains through image processing on the preview image is the subject position information, the light control unit 120 defines the position of the subject that is to be captured as a first type area 610 (i.e. a foreground area, scrambled dotted area in FIG. 6) and defines the rest of the capture range as a second type area 620 (i.e. a background area, blank area in FIG. 6). In this embodiment, the light control unit 120, for example, controls the multi-directional lighting unit 130 to project a predetermined light beam corresponding to the current flashlight setting only to the first type area 610 where the subject is located but project no light beam (or project a weaker light beam) to the second type area 620 which belongs to the background.

Figure 7:
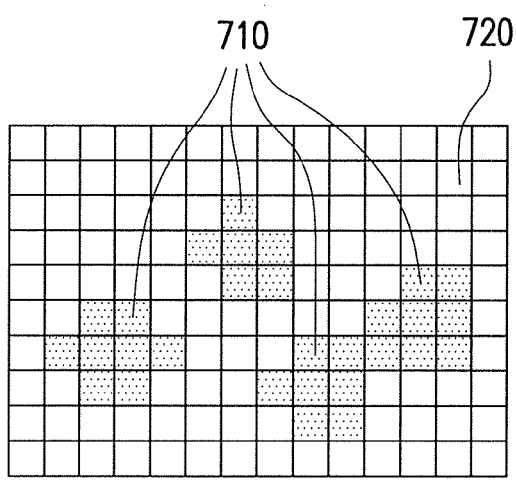

Referring to FIG. 7, in this embodiment, given the image feature information that the signal processing unit 140 obtains through image processing on the preview image is the face feature information, the light control unit 120 defines the positions of four faces a first type area 710 (dotted area in FIG. 7) and defines the rest of the capture range as a second type area 720 (blank area in FIG. 7). For instance, the light control unit 120 controls the multi-directional lighting unit 130 to project a green light beam only to the first type area 710 where the faces are located and project a red light beam to the second type area 720 where no face appears. Accordingly, the green light beam can be used as an indication for determining if all the subjects before the image capturing device 100 are within the capture range.

Figure 8:
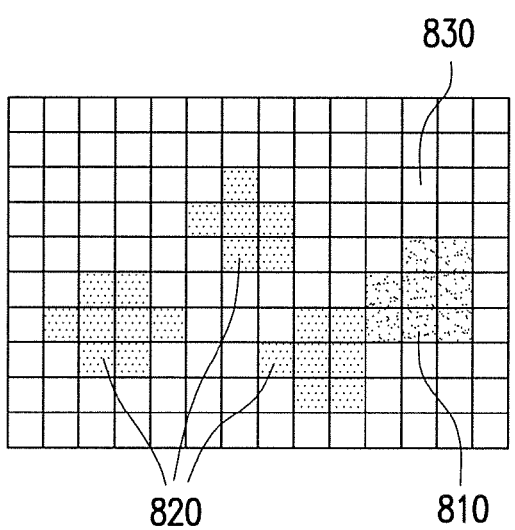

In the embodiment of FIG. 8, the signal processing unit 140 further obtains the subject identification information corresponding to each face, so as to recognize the position of the face of the holder of the image capturing device 100. The light control unit 120 defines the position of the face of the holder as a first type area 810 (scrambled dotted area in FIG. 8), defines the positions of the other three faces as a second type area 820 (dotted area in FIG. 8), and defines the rest of the capture range as a third type area 830 (blank area in FIG. 8). The light control unit 120, for example, controls the multi-directional lighting unit 130 to project a brighter light beam to the first type area 810, project a darker light beam to the second type area 820, and project no light beam to the third type area 830.

In other embodiments, the light control unit 120 can control the multi-directional lighting unit 130 to project a light beam only to an area with the largest face or an area with several larger faces.

Figure 9:
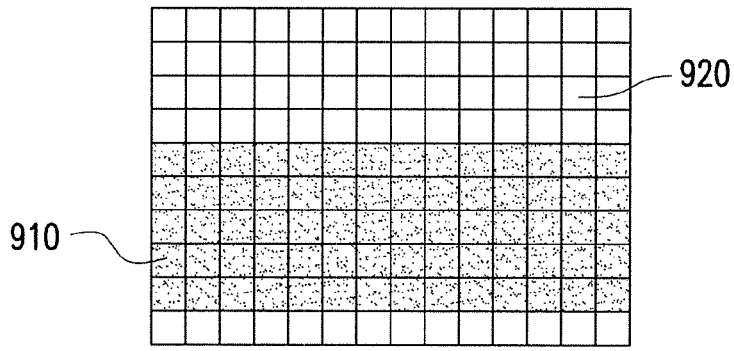

In the embodiment of FIG. 9, the light control unit 120 defines a backlight portion as a first type area 910 (scrambled dotted area in FIG. 9) and defines the rest of the capture range as a second type area 920 (blank area in FIG. 9) based on the image recognition result obtained by the signal processing unit 140. In this embodiment, the light control unit 120 for example controls the multi-directional lighting unit 130 to perform light compensation for the backlighted first type area 910. In other words, the multi-directional lighting unit 130 projects different types of light beams to the first type area 910 and the second type area 920, so as to compensate the light for the darker area.

If the image capturing device 100 is in the capture mode, the light control unit 120 can control the multi-directional lighting unit 130 to continuously project a light beam to the area of the holder of the image capturing device 100 (or other specific persons or objects), so as to prevent blurring of the capture result.

Figure 10:
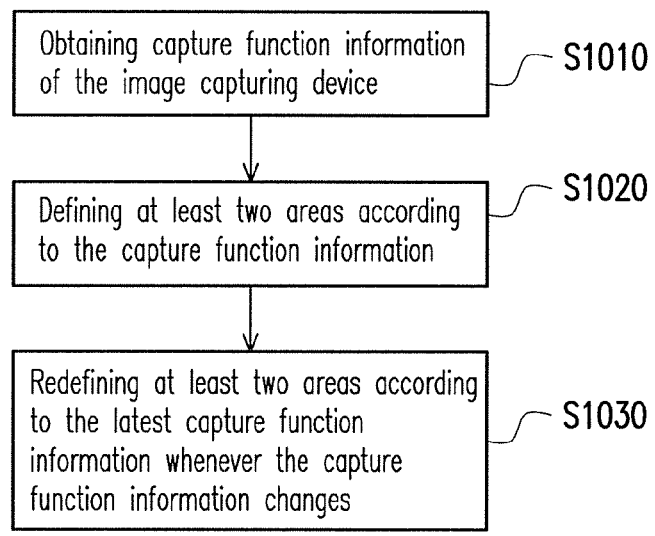
FIG. 10 is a flowchart showing a process of defining areas based on capture function information according to an embodiment of the invention.

FIG. 10 is a flowchart showing a process of defining areas based on capture function information according to an embodiment of the invention. In this embodiment, as shown in Step S1010, the light control unit 120 first obtains the current capture function information of the image capturing device 100 after the image capturing device 100 enters the capture mode. For example, the capture function information includes composition information (e.g. positions of auxiliary lines for golden ratio of the image) stored in the storage unit 150, scenery mode setting information provided by the scenery mode setting module 190, countdown status information provided by the timing module 180, flashlight information and exposure status information provided by the photometer module 160, focus status information provided by the focus module 170, etc.

Then, in Step S1020, the light control unit 120 defines at least two areas according to the capture function information.

Thereafter, as shown in Step S1030, the light control unit 120 redefines at least two areas according to the latest capture function information whenever the capture function information changes.

Figure 11:
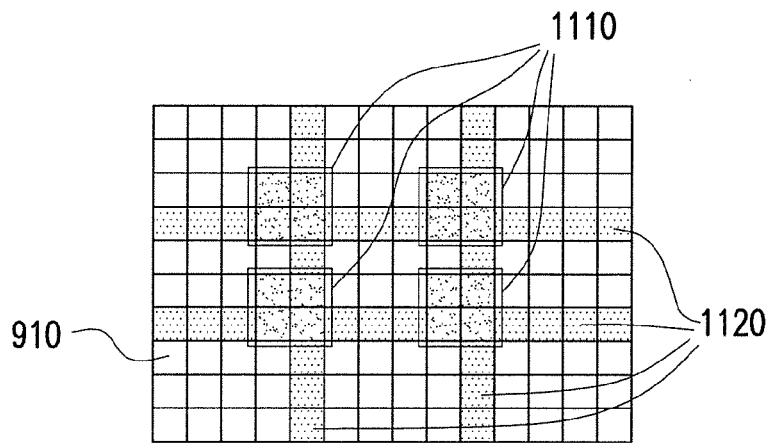

FIG. 11 is a schematic diagram showing that the multi-directional lighting unit 130 is controlled by the light control unit 120 to project different light beams respectively to at least two latest-defined areas after the at least two latest-defined areas are defined in the process of FIG. 10.

Referring to FIG. 11, in the embodiment, given the capture function information obtained by the light control unit 120 is the composition information (e.g. positions of auxiliary lines for golden ratio of the image) stored in the storage unit 150, the light control unit 120 controls the multi-directional lighting unit 130 to project an orange light beam to intersections of the auxiliary lines (a first type area 1110, scrambled dotted area in FIG. 11), project a green light beam to the rest portion of the auxiliary lines (a second type area, dotted area in FIG. 11), and project no light beam to the rest areas. Accordingly, the subject that is to be captured before the image capturing device 100 can determine if his/her position matches the golden ratio of the capture result based on the color of the light beam he/she sees.

In an embodiment, the capture function information obtained by the light control unit 120 is the scenery mode setting information provided by the scenery mode setting module 190. In that case, the light control unit 120 controls the multi-directional lighting unit 130 to project light beams of different colors according to the current scenery mode. For example, when the image capturing device 100 is set to the portrait mode, the light control unit 120 controls the multi-directional lighting unit 130 to project the orange light beam to an area of the subject's face and project an ordinary light beam to an area where no face appears, such that the face of the subject in the capture result has a ruddy complexion. If the image capturing device 100 is set to the night scenery mode, the light control unit 120 controls the multi-directional lighting unit 130 to project a blue light beam to embellish the capture result. Moreover, when the image capturing device 100 is set to the night portrait mode or backlight portrait mode, the light control unit 120 controls the multi-directional lighting unit 130 to respectively project green and red light beams to an area of faces (and project no light beam or an ordinary light beam to the area where no face appears) so as to embellish the faces.

In an embodiment, the capture function information obtained by the light control unit 120 is the countdown status information provided by the timing module 180. In that case, the light control unit 120 controls the multi-directional lighting unit 130 to project light beams of different colors according to time. For example, when the time before the capturing unit 110 actually obtains the capture result is counted down to 5-3 seconds, the light control unit 120 controls the multi-directional lighting unit 130 to project a yellow light beam per 0.5 second; when the time is counted down to 3-0.8 seconds, the light control unit 120 controls the multi-directional lighting unit 130 to project an orange light beam per 0.1 second; and when the time is less than 0.8 second, the light control unit 120 controls the multi-directional lighting unit 130 to project a red light beam per 0.1 second. It is worth mentioning that the light control unit 120 is capable of controlling the multi-directional lighting unit 130 to project the light beams of specific colors, indicating the remaining time, only to the area where the faces are located and project no light beam to the area where no face appears. Furthermore, the light control unit 120 is also capable of controlling the multi-directional lighting unit 130 to project light beams of different colors respectively to an area of each face according to the identification information corresponding thereto.

In an embodiment, given the capture function information obtained by the light control unit 120 is the focus status information provided by the focus module 170, the light control unit 120 controls the multi-directional lighting unit 130 to project a green light beam to the foreground area while the focus module 170 is performing focusing. As soon as the focus module 170 completes focusing (that is, the focus status information changes), the light control unit 120 controls the multi-directional lighting unit 130 to project a blue light beam to the foreground area. In this embodiment, the light control unit 120 is capable of controlling the multi-directional lighting unit 130 to project light beams of specific colors that correspond to the current focus status only to the foreground area and project no light beam or an ordinary light beam to the background area.

In an embodiment, given the capture function information obtained by the light control unit 120 is the exposure status information provided by the photometer module 160, the light control unit 120 controls the multi-directional lighting unit 130 to project an orange light beam to the foreground area while the exposure status information indicates that the image capturing device 100 is still in the exposure status. As soon as the exposure status information changes to indicate that the exposure is completed, the light control unit 120 controls the multi-directional lighting unit 130 to project a green light beam to the foreground area. In this embodiment, the light control unit 120 is capable of controlling the multi-directional lighting unit 130 to project light beams of specific colors that correspond to the current exposure status only to the foreground area and project no light beam or an ordinary light beam to the background area.

In an embodiment, the capture function information obtained by the light control unit 120 is the flashlight information provided by the photometer module 160 and the scenery mode setting information provided by the scenery mode setting module 190. When the aforementioned information indicates that the image capturing device 100 is set to the night scenery mode with the flashlight turned on, the light control unit 120 for example determines the intensity of the light beam according to the information provided by the photometer module 160 and controls the multi-directional lighting unit 130 to project an orange light beam to the area of the faces according to the intensity to emphasize the ruddy complexion and project a light beam that corresponds to the current flashlight setting to the area where no face appears to enhance the effect of night scenery.

It should be noted that the light control unit 120 can define at least two areas according to one or several image feature information, one or several capture function information, or a combination of the image feature information and the capture function information.

In addition, the light control unit 120 can control the multi-directional lighting unit 130 to simultaneously project different types of light beams to the at least two areas through an image signal or a control signal.

Take the image signal as an example, the light control unit 120 generates the image signal according to at least two latest-defined areas and the light property setting of the corresponding information stored in the storage unit 150. More specifically, the information (image feature information and/or capture function information), by which the light control unit 120 defines the areas, respectively corresponds to one light property setting (stored in the storage unit 110). When the light control unit 120 defines the areas according to the information, the light control unit 120 obtains the light property setting corresponding to the information from the storage unit 110 and simultaneously refers to the positions of the defined areas to generate the image signal. After the image signal is transmitted to the multi-directional lighting unit 130, the multi-directional lighting unit 130 can achieve the effect of simultaneously projecting different light beams to at least two areas simply by outputting the image signal.

Take the control signal as an example, the light control unit 120 generates the control signal according to at least two latest-defined areas and the light property setting of the corresponding information stored in the storage unit 150. The control signal corresponds to the positions of the areas and the color, intensity, duration, and pattern determined according to the light property setting. After the light control unit 120 transmits the control signal to the multi-directional lighting unit 130, the multi-directional lighting unit 130 analyzes the control signal to adjust one of a color setting and a DMD (Digital Micro-mirror Device) status setting or a combination thereof, so as to achieve the effect of simultaneously projecting different light beams to at least two latest-defined areas. Specifically, the DMD status setting includes a spectrum setting related to color, determining which micro-mirrors are set to ON (i.e. a status allowing light beams to pass), and setting time for switching the micro-mirrors between ON and OFF (e.g. a time ratio of ON to OFF of the micro-mirrors in the time of an image). It should be noted that the different light beams projected to different areas have different light colors and/or light intensities, for example. For instance, when two light beams having the same color are projected to two areas, one of the two light beams may be brighter and the other may be darker (different light intensities). Moreover, if the light intensity is 0, no light beam is projected. Therefore, the light beam may be projected only to one area and not to the other area. In addition, the projected two light beams may have different colors, such as red and green.

The following embodiments explain an operation of the image capturing device 100 which adopts a capturing method with light assistance.

In an embodiment, given that the user uses the image capturing device 100 to take a photo of the persons before the image capturing device 100, the signal processing unit 140 detects three faces in the preview image, and the image capturing device 100 is currently set to the night mode (the flashlight of the image capturing device 100 is set to ON in this mode). The light property setting corresponding to the image feature information stored in the storage unit 150 regulates to flash an artificial daylight (D50 light beam) to all the areas of the faces. When the user presses the shutter button, the light control unit 120 generates the control signal that sets the spectrum and ON/OFF of the micro-mirrors according to the areas where the three faces are located and the light property setting stored in the storage unit 120, and transmits the control signal to the multi-directional lighting unit 130. Accordingly, the multi-directional lighting unit 130 adopts a specific RGB spectrum (e.g. R:x1.2, G:x1, B:x0.6) according to the control signal and sets the micro-mirrors belonging to the areas of the faces to full-ON, and then projects light beams at a speed of 1/30 second, for example. It is noted that, in another embodiment, the light control unit 120 adjusts positions of the light beams projected from the multi-directional lighting unit 130 according to a position offset of the multi-directional lighting unit 130 and the capturing unit 110 in the image capturing device 100, so as to assure that the light beams from the multi-directional lighting unit 130 are completely projected to the areas of the faces.

In an embodiment, given the signal processing unit 140 further analyzes whether the persons before the image capturing device 100 smile after performing signal processing on the preview image, the light control unit 120 controls the multi-directional lighting unit 130 to project different light beams to the areas of the faces based on degrees of smile and project no light beam to the areas where no face appears according to the light property setting stored in the storage unit 150. For example, given the person in an area smiles, the light control unit 120 controls the multi-directional lighting unit 130 to project a yellow light beam to the area. If the person in the area only gives a slight smile, the light control unit 120 controls the multi-directional lighting unit 130 to project an orange light beam to the area. If the person in the area does not smile, the light control unit 120 controls the multi-directional lighting unit 130 to project a red light beam to the area. Alternatively, the multi-directional lighting unit 130 can project a red light beam to all the areas of the faces if no person smiles. In the case that some of the persons do not smile, the multi-directional lighting unit 130 projects an orange light beam to all the areas of the faces. Moreover, in the case that all the persons have smile, the multi-directional lighting unit 130 projects a yellow light beam to all the areas of the faces. In this embodiment, the light control unit 120 directly generates the image signal, turns on the multi-directional lighting unit 130, and transmits the image signal to the multi-directional lighting unit 130. The multi-directional lighting unit 130 achieves the aforementioned effects simply by imitating the original spectrum and DMD status setting to display the image signal.

In an embodiment, the signal processing unit 140 is capable of detecting whether the persons before the image capturing device 100 blink after performing signal processing on the preview image, and the corresponding light property setting stored in the storage unit 150 regulates a light signal to be generated, which allows the user to know if any of the persons blinks. To be more specific, if any of the persons blinks, the light control unit 120 controls the multi-directional lighting unit 130 to continuously project a red light beam to all the areas of the faces (and project no light beam to the areas where no face appears), and the light control unit 120 controls the multi-directional lighting unit 130 to project a green light beam to all the areas of the faces when no one blinks. The capturing unit 110 automatically obtains the capture result after the green light beam is projected, and the light control unit 120 instantly controls the multi-directional lighting unit 130 to project light beams to the areas of the faces when the image is captured based on whether any of the persons blinks when the shutter button is pressed. For instance, if any of the persons blinks when the image is captured, the light control unit 120 controls the multi-directional lighting unit 130 to project a red light beam to all the areas of the faces. Accordingly, the user can know if the capture result is favorable based on the color of the light beam. In this embodiment, the light control unit 120 directly generates the image signal, turns on the multi-directional lighting unit 130, and transmits the image signal to the multi-directional lighting unit 130. The multi-directional lighting unit 130 can achieve the aforementioned effects simply by imitating the original spectrum and DMD status setting to display the image signal.

In an embodiment, the image capturing device 100 is set to the video and night modes, and the light property settings corresponding to the two modes stored in the storage unit 150 regulate to track the holder of the image capturing device 100 and project a ruddier light beam. When the holder of the image capturing device 100 is located by the capturing unit 110, the light control unit 120 controls the multi-directional lighting unit 130 to project an orange light beam to the area where the holder is located and project a gray light beam to the other areas. While the capturing unit 110 is recording a video, the light control unit 120 tracks a movement of the holder and controls the multi-directional lighting unit 130 to continuously project an orange light beam to the area where the holder is located. When the shutter button of the image capturing device 100 is pressed, the light control unit 120 controls the multi-directional lighting unit 130 to project a high-brightness orange light beam to the area where the holder is located for two seconds and project a gray light beam to the other areas for two seconds.

It is worth mentioning that, after obtaining the capture result, the light control unit 120 determines whether the different light beams are not respectively projected to a specific target according the capture result. Specifically, the specific target is the face of the holder of the image capturing device 100 (or the face or other parts of a specific person or a specific object, etc.), for example. If the light beams are not projected to the specific target, the light control unit 120 dynamically controls the multi-directional lighting unit 130 to simultaneously project different light beams to at least two latest-defined areas according to a spatial difference between the projection positions of the different light beams projected to at least two latest-defined areas and the specific target before obtaining a next capture result.

Based on the above, if the light beams are not projected to the specific target in the first capture result, the angles at which the light beams are projected can be rectified according to the capture result to continuously track and project light beams to the specific target. That is to say, even if there is a larger distance between a lens of the capturing unit 110 and the multi-directional lighting unit 130, the aforementioned feedback process can rectify the angles of projecting light beams, so as to obtain a better capture result.

In another embodiment, given the positions of the areas change before the capture result is obtained, the light control unit 120 controls the multi-directional lighting unit 130 to continuously project different light beams to at least two latest-defined areas according to the change of the positions. That is, in the case that the target moves, the light control unit 120 continuously locks on the target in the areas to assure that the light beams are projected to the target in the capture result. On the other hand, an effect similar to using a stage spotlight to illuminate the target is also achieved during the capture. For example, during a speech, the image capturing device 100 can be pointed toward the stage to continuously illuminate the speaker as he/she moves.

In conclusion of the above, the image capturing device and the capturing method with light assistance of the invention control the multi-directional lighting unit to simultaneously project different light beams to different areas according to image feature information and/or capture function information. Accordingly, the light beams can be projected to a person or object as the user desires or expects, and the user of the image capturing device or the subject can interact with the image capturing device by means of the various light beams projected therefrom, so as to obtain a better capture result.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A capturing method with light assistance, adapted for an image capturing device comprising a multi-directional lighting unit therein, the capturing method comprising:

continuously defining at least two areas according to information provided by the image capturing device after the image capturing device enters a capture mode;

dynamically controlling the multi-directional lighting unit to simultaneously project different light beams to at least two latest-defined areas before a capture result is obtained;

determining whether the different light beams that are respectively projected to the at least two latest-defined areas are not projected to a specific target according to the capture result after obtaining the capture result; and dynamically controlling the multi-directional lighting unit to simultaneously project the different light beams to the at least two latest-defined areas according to a spatial difference between projection positions of the different light beams projected to the at least two latest-defined areas and the specific target before obtaining a next capture result if the different light beams are not projected to the specific target.

2. The capturing method as claimed in claim 1, wherein the image capturing device continuously obtains a preview image after entering the capture mode, and the step of continuously defining the at least two areas according to the information provided by the image capturing device comprises:

periodically performing an image processing on a latest preview image to obtain image feature information, wherein the image feature information comprises face feature information, subject position information, and subject identification information;

analyzing the image feature information to obtain an image recognition result; and defining the at least two areas according to the image recognition result.

3. The capturing method as claimed in claim 2, further comprising:

referring to a light property setting corresponding to the image feature information to determine the different light beams to be respectively projected to the at least two latest-defined areas.

4. The capturing method as claimed in claim 1, wherein the step of continuously defining the at least two areas according to the information provided by the image capturing device after the image capturing device enters the capture mode comprises:

obtaining capture function information of the image capturing device, wherein the capture function information comprises composition information, scenery mode setting information, countdown status information, flashlight information, focus status information, and exposure status information;

defining the at least two areas according to the capture function information; and redefining the at least two areas according to the latest capture function information whenever the capture function information changes.

5. The capturing method as claimed in claim 4, further comprising:

referring to a light property setting corresponding to the capture function information to determine the different light beams to be respectively projected to the at least two latest-defined areas.

6. The capturing method as claimed in claim 1, wherein the step of dynamically controlling the multi-directional lighting unit to simultaneously project the different light beams to the at least two latest-defined areas comprises:
- generating an image signal according to the at least two latest-defined areas and a light property setting corresponding to the information;
- transmitting the image signal to the multi-directional lighting unit; and
- outputting the image signal by the multi-directional lighting unit to simultaneously project the different light beams to the at least two latest-defined areas.

7. The capturing method as claimed in claim 1, wherein the step of dynamically controlling the multi-directional lighting unit to simultaneously project the different light beams to the at least two latest-defined areas comprises:
- generating a control signal according to the at least two latest-defined areas and a light property setting corresponding to the information;
- transmitting the control signal to the multi-directional lighting unit; and
- adjusting, according to the control signal, one of a color setting and a DMD (Digital Micro-mirror Device) status setting or a combination thereof by the multi-directional lighting unit to simultaneously project the different light beams to the at least two latest-defined areas.

8. The capturing method as claimed in claim 1, wherein the different light beams respectively projected to the at least two latest-defined areas have different light colors and/or light intensities.

9. The capturing method as claimed in claim 1, further comprising:
- if a position of the at least two latest-defined areas changes before the capture result is obtained, controlling the multi-directional lighting unit to continuously project the different light beams to the at least two latest-defined areas according to the change of the position.

10. An image capturing device, comprising:
- a multi-directional lighting unit simultaneously projecting different light beams toward different directions;
- a capturing unit; and
- a light control unit coupled to the multi-directional lighting unit and the capturing unit,
- wherein the light control unit continuously defines at least two areas according to information provided by the image capturing device after the image capturing device enters a capture mode,
- the light control unit dynamically controls the multi-directional lighting unit to simultaneously project the different light beams to at least two latest-defined areas before the capturing unit obtains a capture result,
- the light control unit determines whether the different light beams that are respectively projected to the at least two latest-defined areas are not projected to a specific target according to the capture result after obtaining the capture result, and
- the light control unit dynamically controls the multi-directional lighting unit to simultaneously project the different light beams to the at least two latest-defined areas according to a spatial difference between projection positions of the different light beams projected to the at least two latest-defined areas and the specific target before obtaining a next capture result if the different light beams are not projected to the specific target.

11. The image capturing device as claimed in claim 10, further comprising:
- a storage unit coupled to the light control unit and storing a light property setting respectively corresponding to the information; and
- a signal processing unit coupled between the capturing unit and the light control unit,
- wherein the capturing unit constantly obtains a preview image after the image capturing device enters the capture mode, and the signal processing unit periodically performs an image processing on the latest preview image to obtain image feature information, analyzes the image feature information to obtain an image recognition result, and transmits the image recognition result to the light control unit, wherein the image feature information comprises face feature information, subject position information, and subject identification information, and
- the light control unit defines the at least two areas according to the image recognition result, and refers to the light property setting corresponding to the image feature information stored in the storage unit to determine the different light beams that are to be respectively projected to the at least two latest-defined areas.

12. The image capturing device as claimed in claim 11, wherein the light control unit obtains capture function information of the image capturing device and defines the at least two areas according to the capture function information after the image capturing device enters the capture mode, and the light control unit redefines the at least two areas according the latest capture function information whenever the capture function information changes, the capture function information comprises composition information, scenery mode setting information, countdown status information, flashlight information, focus status information, and exposure status information,
- wherein the light control unit refers to the light property setting corresponding to the capture function information stored in the storage unit to determine the different light beams that are to be respectively projected to the at least two latest-defined areas.

13. The image capturing device as claimed in claim 11, wherein the light control unit generates an image signal according to the at least two latest-defined areas and the light property setting stored in the storage unit corresponding to the information and transmits the image signal to the multi-directional lighting unit,
- and the multi-directional lighting unit outputs the image signal to simultaneously project the different light beams to the at least two latest-defined areas.

14. The image capturing device as claimed in claim 11, wherein the light control unit generates a control signal according to the at least two latest-defined areas and the light property setting corresponding to the information stored in the storage unit and transmits the control signal to the multi-directional lighting unit,
- and the multi-directional lighting unit adjusts one of a color setting and a DMD status setting or a combination thereof according to the control signal to simultaneously project the different light beams to the at least two areas.

15. The image capturing device as claimed in claim 10, wherein the multi-directional lighting unit is a projector or a projecting device, or comprises a plurality of light emitting diodes (LED) light having a lens.

16. The image capturing device as claimed in claim 10, wherein the different light beams respectively projected to the at least two latest-defined areas have different light colors and/or light intensities.

17. The image capturing device as claimed in claim 10, wherein, if a position of the at least two latest-defined areas changes before the capture result is obtained, the light control unit controls the multi-directional lighting unit to continuously project the different light beams to the at least two latest-defined areas according to the change of the position.

\* \* \* \* \*